Dec. 6, 1949  J. P. SEAHOLM ET AL  2,490,656
REAR WHEEL MOUNTING AND LOCK
Filed May 9, 1945  3 Sheets-Sheet 1
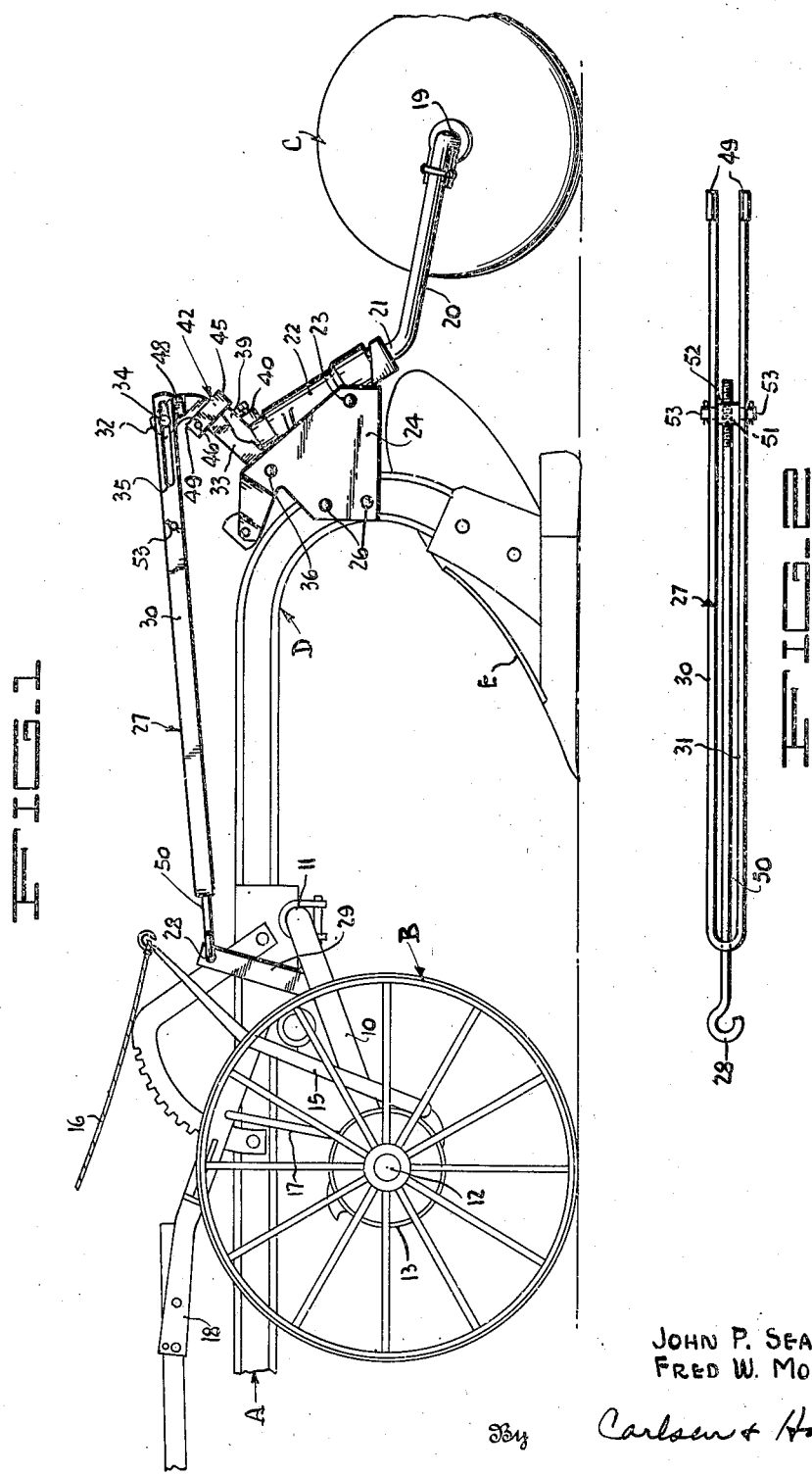
Inventors
JOHN P. SEAHOLM
FRED W. MOLANDER
By Carlsen & Hagle
Attorney

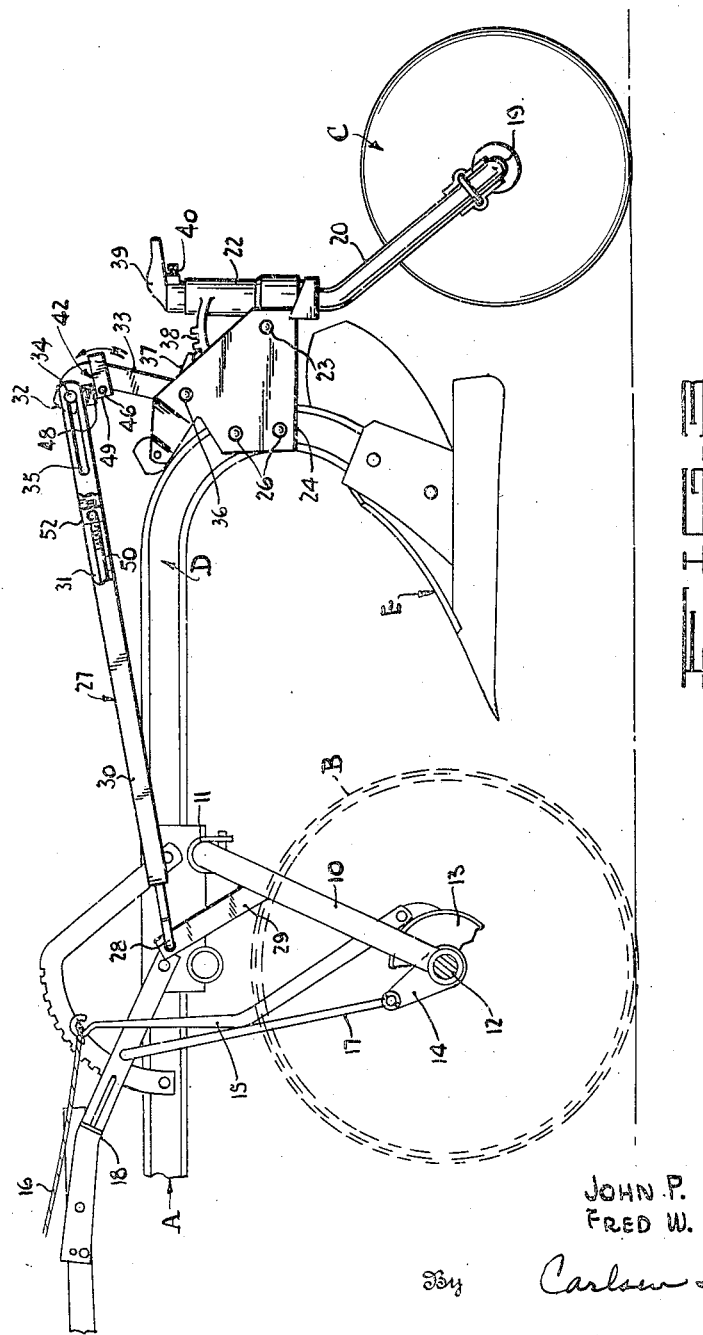

Dec. 6, 1949 J. P. SEAHOLM ET AL 2,490,656
REAR WHEEL MOUNTING AND LOCK
Filed May 9, 1945 3 Sheets-Sheet 3

Inventors
JOHN P. SEAHOLM
FRED W. MOLANDER
By Carlsen + Hagle
Attorneys

Patented Dec. 6, 1949

2,490,656

UNITED STATES PATENT OFFICE 2,490,656

REAR WHEEL MOUNTING AND LOCK

John P. Seaholm and Fred W. Molander, Moline, Ill., assignors, by mesne assignments, to Minneapolis-Moline Company, Hopkins, Minn., a corporation of Minnesota Application May 9, 1945, Serial No. 592,734

14 Claims. (Cl. 97—127)

This invention relates to improvements in rear wheels for gang plows and more particularly to improvements in mounting and locking means for such wheels.

In the ordinary gang plow of the kind here in mind a rear wheel is provided trailing the plow bottoms and immediately behind the landward bottom. This wheel runs in the furrow in the corner formed by the furrow bottom and its side wall, and acts not only to support the rear end of the machine but also as a guide for the plow bottoms themselves. When the plow is in operation it therefore follows that the rear wheel must be locked in the proper position to engage the furrow and fulfill its guiding function whereas, when the bottoms are lifted to transport positions, the rear wheel must be freed and allowed to caster and so follow any direction in which the plow may be guided.

The primary object of the present invention is to provide an improved mounting for the rear wheel of a gang plow of this nature and embodying locking means whereby the wheel is positively locked in all plowing positions and can and will be unlocked only in response to the mechanism causing movement of the wheel toward its transport position. Another object is to provide latch or lock means for this purpose which may be readily attached to gang plows of present day construction and without requiring any major reorganization of the parts thereof.

These and other more detailed and specific objects will be disclosed in the course of the following specification, reference being had to the accompanying drawings, in which—

Fig. 1 is a side elevation of a gang plow embodying the present invention, only a single bottom being shown and the rear wheel being illustrated in its locked condition.

Fig. 2 is an enlarged inverted plan view of the link or actuating bar for the rear wheel, alone.

Fig. 3 is a view similar to Fig. 1 but with the plow in transport position and the rear wheel unlocked to caster, and the near or land wheel of the plow being shown only in dotted lines.

Figure 4:
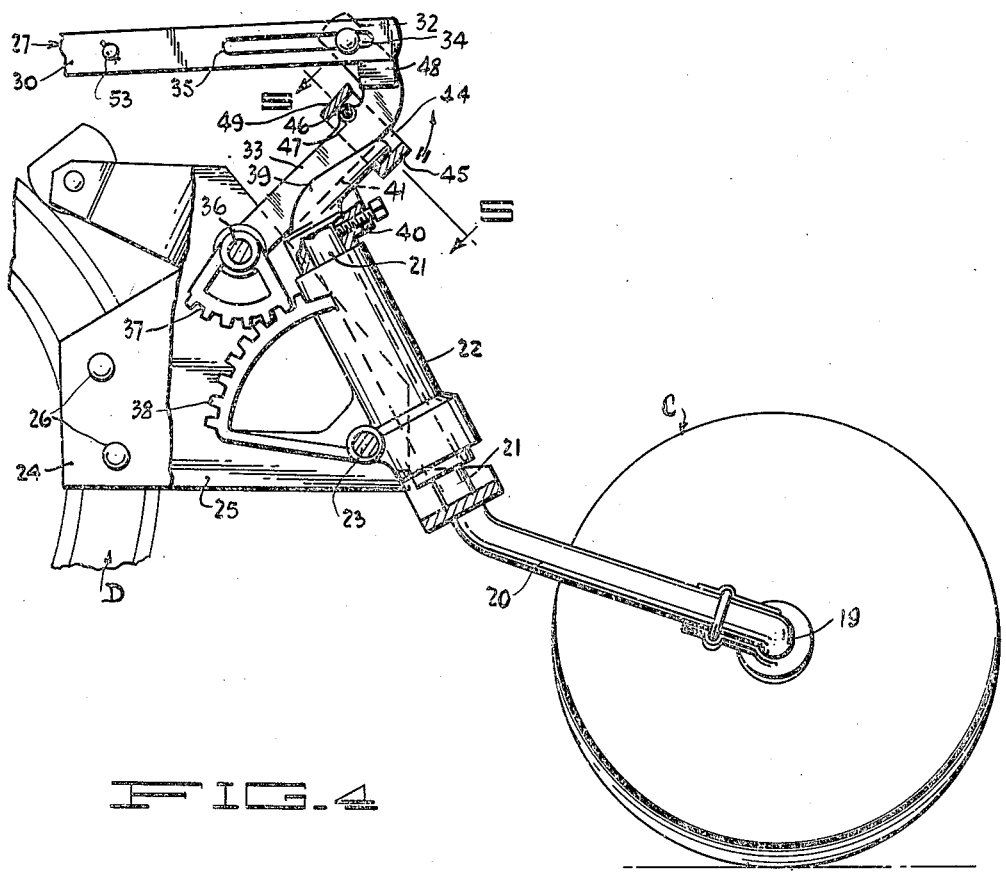
Fig. 4 is an enlarged fragmentary side elevation of the rear wheel and mounting alone, certain parts being shown broken away and in vertical, longitudinal section.

The gang plow herein illustrated is conventional in and of itself and comprises a frame A supported forwardly by a pair of large wheels, of which only the near or land wheel B is shown, and rearwardly supported by a smaller rear wheel C. The frame A carries, by means of a rearwardly and downwardly curved beam D, a plow bottom or share E and, of course, ordinarily two or more of such bottoms are carried by the frame each on its own beam. It is to and behind the landward beam and bottom, however, that the rear wheel C is mounted and for convenience only a single plow bottom and beam are here shown.

The land wheel B is supportably connected to the frame A by a crank axle 10 journaled at one end 11 across the frame and at its other end carrying an axle shaft 12 upon which the wheel, and a power lift clutch 13, are mounted. The clutch 13 operates to rotate a crank 14, under power supplied by travel of wheel B, when a trip lever 15 is actuated by a trip rope 16. The crank 14 is connected by a link rod 17 to a depth adjusting lever 18 on the frame and the arrangement is such that one pull on the rope 16 will cause the crank 14 to swing a half turn pushing upward on the rod 17 to force the crank axle downwardly about its pivot 11 and so raise the frame, while another pull on the rope will cause the crank to rotate another half turn allowing the crank axle to swing upward and so lower the frame. The position of the lever 18 will obviously regulate the height of the frame, and the plow bottom E, in its plowing position.

The other or furrow wheel (not here shown) is similarly supported but is raised and lowered independently and by hand to adjust the transverse tilt or angle of the machine.

The rear wheel C is journaled upon the end 19 of a bent axle 20 which has a caster mounted end 21 journaled in a bearing sleeve 22. Said sleeve 22 is pivoted on a transversely extending pin 23 between spaced mounting plates 24—25 which are secured at 26 to opposite sides of the beam D above the bottom E. The sleeve 22 is thus supported to swing, along with the axle 20, in an upright longitudinal plane such as to cause upward and downward adjustments of the rear wheel C with respect to the plow frame.

The wheel is thus adjusted, as the frame is raised and lowered and to keep the same level fore and aft, by an actuating bar or link 27 the forward end of which is attached by a hook 28 to an arm 29 welded or otherwise secured rigidly to the crank axle 10. The link 27 has spaced sides 30—31 which at rear ends straddle the upper forwardly turned end 32 of a rear axle adjusting lever 33 and a pin 34 connects the link and arm and plays in slots 35 extending lengthwise in each side 30—31 of the link. The lever 33 is pivoted on a pin 36 between the mounting plates 24 and 25 to swing in a plane parallel to that in which the sleeve 22 moves and operates a segment gear 37 which meshes with a gear segment 38 forming a rigid part of the sleeve.

The foregoing arrangement is obviously such that a forward pull upon the link 27 will swing the lever 33 forwardly, causing the gears 37—38 to translate this movement to a rearward swinging movement of the sleeve 22 such as to move the wheel supported end of the rear axle 20 downwardly with respect to the frame. Such forward movement of the link 27 will be caused by the downward, forward travel of the arm 29 as the crank axle 10 swings downwardly to raise the frame and it will be apparent that by proper choice of the leverages involved the relative downward movements of all the wheels may be caused to keep the plow level in all adjustments. It follows, of course, that on lowering the plow the link 27 will move rearwardly to allow the rear wheel C to rise as required.

When the plow is raised to transport position (Fig. 3) the sleeve 22 is substantially upright so that the rear wheel C may caster freely and follow the plow as it is guided from side to side. However, when the plow is lowered and ready for plowing the rear wheel must be locked against sideward or castering movements so that it may run against the furrow wall (not shown) and so guide the plow in the usual fashion. For this purpose there is provided a locking arm 39 which is rigidly secured at 40 to the upper extremity of the axle end 21 above the sleeve 22 to turn with the axle about its caster axis. The arm 39 is channel shaped providing a groove as indicated at 41, and this groove is adapted to upwardly engage and embrace a lower rear edge portion of the lever 33 immediately above the sleeve as the parts assume their normal plowing positions (Figs. 1 and 4). The axle end 21 is thus held against turning and the rear wheel C is locked in proper position for plowing. As the plow is raised, however, the lever 33 swings forwardly as the sleeve 22 swings rearwardly with the result that the locking arm 39 quickly clears the lever and the axle 20 and rear wheel are released (Fig. 3) ready to caster as required.

Figure 5:
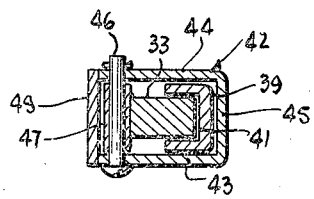
Fig. 5 is an enlarged sectional view along the line 5—5 in Fig. 4.

This locking arrangement is sufficient under normal conditions but, as will be apparent, becomes ineffective should the rear wheel drop into a depression or the relative positions of the sleeve 22 and lever 33 become otherwise so disturbed as to cause the locking arm to clear the lever. To prevent this, in accordance with the present invention, a swinging latch or latch yoke or loop designated generally at 42 is provided upon the lever 33. This latch as it will be termed has sides 43—44 joined by a bight or end portion 45 and the sides 43—44 are pivotally attached by a pin 46 to the lever 33 above the locking arm. The pin 46 may be carried in a tubular bearing 47 welded to the lever on its forward side, and the sides 43—44 are adapted to clear the sides of the lever a considerable distance while the end 45 stands well to the rear thereof. The arrangement is such that, of its own weight, the latch will normally swing downward over the upper end of the locking arm 39 with the U-shaped sides 43—44 and end 45 embracing the arm in such manner that the arm is locked in engagement with lever 33. See Figs. 1, 4 and 5. The clearances are such, however, that the latch may be swung upwardly at its rear end (Fig. 3, and as indicated by the arrows in Figs. 3 and 4) to clear the locking arm 39 so that this arm may, as stated heretofore, swing free of the lever 33 to allow the wheel to caster.

The latch 42 is thus operated by cams or cam lugs 48 secured to or formed on the lower rear edges of the sides 30—31 of the rear wheel actuating link 27. These cams 48, which hang below the link, cooperate with a cam plate 49 secured to and joining the forward ends of the latch sides 43—44. The plate 49, which constitutes the forward end of the rectangular loop-like formation of the latch 42, lies in the path of and forwardly of the cams 48 in the normal position of the latch, and the forward movement of the link 27 in raising the plow thus carries the cams forwardly over the plate 49 causing the forward end of the latch to be depressed. This, of course, elevates its rear end so that the locking arm 39 is released. When the link 27 again moves rearwardly as the plow is powered the cams 48 will move off the plate 49 allowing the latch to reengage the locking lever but this action will occur only when the lever is in proper locked relation with lever 33 and ready to be latched as will be understood. The effect of the latch 42 is of course to lock the entire swinging assembly of the sleeve 22 and gear 38, and lever 33 and gear 37 unmovably together and so prevent movement of the rear wheel.

It will be noted that the hook 28 at the forward end of the link 27 is formed on a rod 50 which passes slidably rearward (Fig. 2) through the end of the link and is threaded at 51 through a tapped block 52 secured by pins 53 between the sides 30—31 of the link. By releasing the hook 28 from the arm 29 it will be apparent that the rod 50 may be screwed inward or outward in the block 52 to adjust the effective length of the link 27 as a whole. This allows the cams 48 to be adjusted with reference to the plate 49 on the latch 42 so that the latch will release locking arm 39 at just the right time regardless of the position of the depth adjusting lever 18. Normally the cams are located rearwardly of the latch a distance such that the rear end of the slots 35 will not contact the pin 34 and so start the forward movement of the lever 32 until the latch reaches a released position.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a plow, a rear wheel mounting comprising a support, a member pivotally and rotatably supported by said support for swinging movements in an upright plane from an inclined position to a substantially upright position, a wheel supported by said member and adapted to caster therewith in said upright position thereof, a locking arm operative to lock the member against castering movements in said inclined position, and a locking member engageable with said locking arm and having a latch member swingable into and out of engagement with said locking arm to prevent accidental disengagement between the locking arm and locking member.

2. In a plow, a rear wheel mounting comprising a support, a member pivotally and rotatable supported by said support for swinging movements in an upright plane from an inclined position to a substantially upright position, a wheel supported by said member and adapted to caster therewith in said upright position thereof, lever means carried by said support and operative to adjust said member to said positions, a locking arm movable into locking engagement with the said lever means to lock the member against castering action in its inclined position, and a latch element pivotally secured to said lever means for swinging movement with respect thereto to releasably engage the locking arm and prevent disengagement thereof from the lever means.

3. In a plow, a rear wheel mounting comprising a support, a member pivotally and rotatably supported by said support for swinging movements in an upright plane from an inclined position to a substantially upright position, a wheel supported by said member and adapted to caster therewith in said upright position thereof, means carried by said support and operative to adjust said member to said positions, a locking arm movable into locking engagement with the said means to lock the member against castering action in its inclined position, and a movable member carried by said means and operative to releasably hold said locking arm in locking engagement therewith.

4. In a plow, a rear wheel mounting comprising a support, a member pivotally and rotatably supported by said support for swinging movements in an upright plane from an inclined position to a substantially upright position, a wheel carried by said member and adapted to caster therewith in said upright position thereof, means carried by said support and operative to adjust said member to said positions, a locking arm carried by said member and movable into locking engagement with the said means as the member moves to said inclined position to lock the member against castering movements, and a latch yoke movable with respect to the adjusting means and operative to releasably hold said locking arm in such engagement with the adjusting means.

5. In a gang plow, the combination with a link member movable as the plow is raised and lowered, an axle supported for up and down and castering movements at one end, and a wheel on said end of the axle, of a locking mechanism for locking the wheel against castering movements when the plow is lowered, comprising a locking arm movable by the axle, a lever connected to said link member and movable thereby to swing the axle up and down, said locking arm being adapted to engage the lever when the plow is lowered whereby the lever will restrain the arm against swinging movements and lock the axle against castering, a latch member operative to engage and hold the locking arm in engagement with the lever, and cam means on the link member adapted to engage and release said latch member from the arm as said link member is moved responsive to raising the plow.

6. In a gang plow, the combination with a link member movable as the plow is raised and lowered, an axle supported for up and down and castering movements at one end, and a wheel on said end of the axle, of a locking mechanism for locking the wheel against castering movements when the plow is lowered, comprising a locking arm movable by the axle, a lever connected to said link member and movable thereby to swing the axle up and down, said locking arm being adapted to engage the lever when the plow is lowered whereby the lever will restrain the arm against swinging movements and lock the axle against castering, a latch member swingably mounted on the lever and normally engaging and holding the locking arm in engagement with the lever, and means on the link member for engaging and swinging the latch member clear of the locking arm as the link member moves in response to raising movement of the plow.

7. In a gang plow, the combination in a rear caster wheel mounting including a lever for raising and lowering the wheel, a locking arm for locking the wheel against castering movements when the plow is lowered by engaging said lever, and a link member having a slotted connection with the lever and movable endwise as the plow is raised and lowered to move said lever and correspondingly adjust the wheel, of a latch mechanism comprising a latch operative to engage and hold the locking arm in locking engagement with the lever when the plow is lowered, a cam lug on the link member movable therewith into engagement with the latch to swing the latch clear of the locking arm as the link member moves in response to raising the plow, and the said link member being adjustable to vary the relationship between the cam lug and latch.

8. In a gang plow, the combination in a rear caster wheel mounting including a lever for raising and lowering the wheel, a locking arm for locking the wheel against castering movements when the plow is lowered by engaging said lever, and a link member having a slotted connection with the lever and movable endwise as the plow is raised and lowered to move said lever and correspondingly adjust the wheel, of a latch mechanism comprising a latch operative to engage and hold the locking arm in locking engagement with the lever when the plow is lowered, a cam lug on the link member movable therewith into engagement with the latch to swing the latch clear of the locking arm as the link member moves in response to raising the plow, and the link member being adjustable in length to time the engagement of the cam lug with the latch with relation to the raising of the plow.

9. In a plow, in combination, a support, a bearing sleeve pivoted to the support for up and down swinging movements, a furrow wheel having its axle swiveled in said sleeve, a lever operative to swing the sleeve, a locking arm on the axle operative to engage the lever in one position thereof and to restrain the axle against swivel movements in the sleeve, and a member carried by the lever and operative by gravity to normally hold the locking arm in such engagement with the lever.

10. In a plow, in combination, a support, a bearing sleeve pivoted to the support for up and down swinging movements, a furrow wheel having its axle swiveled in said sleeve, a lever operative to swing the sleeve, a locking arm on the axle operative to engage the lever in one position thereof and to restrain the axle against swivel movements in the sleeve, a member supported adjacent the locking arm and operative to normally hold the arm in locking engagement with the lever, and means connected to the lever to swing the bearing sleeve and operative to engage and release said member from the locking arm as the sleeve is swung in one direction.

11. In a plow, the combination with an actuating bar movable as the plow is raised and lowered and a caster wheel having its axle supported on the plow for up and down and castering movements, of a locking mechanism of the character described for locking the wheel against castering movements when the plow is lowered, comprising a locking arm movable by the axle, a lever connected to the actuating bar and movable thereby to swing the axle up and down, said locking arm when the plow is lowered being operative to engage the lever in such manner as to restrain the arm against swinging movements and lock the wheel against castering, a member operative to normally engage and hold the locking arm in locking relation to the lever, and means operative by the movement of the actuating bar as the plow is raised for actuating the said member to free the locking arm.

12. In a plow, the combination in a caster wheel mounting therefor including a lever for raising and lowering the wheel, a locking member operative to engage the lever and lock the wheel againset castering movements when the plow is lowered, and an actuating bar having a lost motion connection with the lever and movable endwise as the plow is raised and lowered to move the lever and properly adjust the wheel, of a member for holding said locking member in locking engagement with the lever when the plow is lowered, the said actuating bar having a part operative to release said holding member from the locking member as the bar moves in raising the plow, and means for adjusting the position of the said part on the actuating bar with respect to the said holding member.

13. In a plow, a rear wheel mounting comprising a support, a member pivotally and rotatably supported by said support for swinging movements in an upright plane, a lever carried by said support and operative to swing the member in said plane, a wheel carried by said member and adapted to caster therewith, a locking arm movable into locking engagement with the lever to prohibit said castering movement, and a latch loop pivoted to the lever and swingable into engagement with the locking arm to releasably secure said locking arm in engagement with said lever.

14. A rear wheel mounting for a plow comprising a support, a member pivotally and rotatably secured to said support for up and down swinging movements, a wheel carried by said member, a lever operative to swing the member, a locking arm on the member operative to engage the lever in one position thereof and to restrain the member against oscillating movements, a latch mounted on the lever adjacent the locking arm and operative to retain the arm in locking engagement with the lever, and a cam acting lug associated with the lever to move the latch from its arm retaining position when the member is swung in one direction and to release the latch to the arm retaining position when the member is swung in the other direction.

JOHN P. SEAHOLM.
FRED W. MOLANDER.

REFERENCES CITED

The following references are of record in the file of this patent:

UNITED STATES PATENTS

| Number | Name | Date |
|---|---|---|
| 1,266,877 | Springer | May 21, 1918 |
| 1,316,696 | Dickinson | Sept. 23, 1919 |
| 1,396,793 | Traphagen | Nov. 15, 1921 |
| 2,056,374 | Strandlund | Oct. 6, 1936 |
| 2,353,659 | Frank | July 18, 1944 |
| 2,383,373 | Dewey | Aug. 21, 1945 |